United States Patent
Brothers

(10) Patent No.: US 7,861,088 B1
(45) Date of Patent: Dec. 28, 2010

(54) METHOD AND SYSTEM FOR VERIFIABLY RECORDING VOICE COMMUNICATIONS

(75) Inventor: Laurence Raphael Brothers, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 894 days.

(21) Appl. No.: 10/315,470

(22) Filed: Dec. 10, 2002

(51) Int. Cl.
  *H04L 9/32* (2006.01)
(52) U.S. Cl. ............... 713/178; 379/67.1; 713/168
(58) Field of Classification Search ......... 713/168–171, 713/178, 155, 181, 189, 193, 194; 380/255, 380/275, 270; 726/2–4, 21; 379/88.02, 85, 379/88.01, 68, 142.05, 142.06, 67.1, 6, 77, 379/84, 183; 704/273, 231, 246; 455/563, 455/416, 410, 411, 415, 412.1; 370/260, 370/5.52, 5.8, 493–495; 340/5.52, 5.8; 348/14.01; 709/204
See application file for complete search history.

(56) References Cited

U.S. PATENT DOCUMENTS

| | | | |
|---|---|---|---|
| 5,136,646 A | | 8/1992 | Haber et al. ............ 380/49 |
| 5,335,265 A | * | 8/1994 | Cooper et al. ............ 455/410 |
| 5,373,561 A | | 12/1994 | Haber et al. ............ 380/49 |
| RE34,954 E | | 5/1995 | Haber et al. ............ 380/49 |
| 5,781,629 A | | 7/1998 | Haber et al. ............ 380/23 |
| 5,995,824 A | * | 11/1999 | Whitfield ............ 455/412.1 |
| 6,125,178 A | * | 9/2000 | Walker et al. ............ 379/211.01 |
| 6,324,271 B1 | * | 11/2001 | Sawyer et al. ............ 379/142.05 |
| 6,529,602 B1 | * | 3/2003 | Walker et al. ............ 380/283 |
| 6,650,737 B2 | * | 11/2003 | Finnigan ............ 379/88.02 |
| 6,757,361 B2 | * | 6/2004 | Blair et al. ............ 379/67.1 |
| 6,792,081 B1 | * | 9/2004 | Contractor ............ 379/45 |
| 6,898,709 B1 | * | 5/2005 | Teppler ............ 713/178 |
| 7,003,286 B2 | * | 2/2006 | Brown et al. ............ 455/416 |
| 7,010,110 B2 | * | 3/2006 | Jorasch et al. ............ 379/207.04 |
| 2001/0044325 A1 | * | 11/2001 | Cox et al. ............ 455/565 |
| 2002/0031209 A1 | * | 3/2002 | Smithies et al. ............ 379/93.12 |
| 2002/0049768 A1 | * | 4/2002 | Peek et al. ............ 707/104.1 |
| 2002/0067810 A1 | | 6/2002 | Barak et al. ............ 379/88.25 |
| 2002/0087861 A1 | * | 7/2002 | Segev et al. ............ 713/168 |
| 2002/0094065 A1 | * | 7/2002 | Squibbs et al. ............ 379/67.1 |
| 2002/0196685 A1 | * | 12/2002 | Topham ............ 365/200 |
| 2003/0028778 A1 | * | 2/2003 | Couillard ............ 713/178 |

* cited by examiner

*Primary Examiner*—Nirav Patel

(57) ABSTRACT

A system and method can verifiably record a voice communication between participants of the voice communication by connecting a first participant to a verifying service provider, connecting between the verifying service and at least one additional participant, recording the voice communication between the first participant and the at least one additional participant to provide a recorded voice communication and secure time-stamping the recorded voice communication to provide a verifiable recorded voice communication. Switch data, such as telephone numbers for the participants and date and time information for the voice communication, can be appended to the recorded voice communication. The participants may input identification data, such as digital signatures, that can be associated with the recorded voice communication and the recorded voice communication can be digitally signed using the digital signatures input by the participants.

23 Claims, 3 Drawing Sheets

METHOD AND SYSTEM FOR VERIFIABLY RECORDING VOICE COMMUNICATIONS

RELATED APPLICATIONS

There are no related applications.

FIELD OF THE INVENTION

The methods and systems relate to voice communications networks, and more particularly to a method and system for recording voice communications such that the date and time of the communication and/or the participants of the communication can be verified.

BACKGROUND

At present, some telephone users, such as commercial users, industrial users, institutional users and the like, may record calls to various media such as audio tape or computer system storage devices, through the use of customer premises equipment (CPE). Most users do not however have this capability. When a voice call has been recorded, the vast majority of such users who do have recording capability have no way to prove that their recording was made at a particular date and time, between particular phone numbers, with particular participants, and further cannot demonstrate that their recording has not been altered or edited. In principle, a user could attest in an affidavit to these facts regarding a recording, but the user's mere statement of the facts may still be readily contested.

This kind of verifiable recording would be of use in commerce for oral contracts and could also be used in other situations in which it is essential that it be demonstrated that some particular agreement or communication had been transmitted at some particular time.

SUMMARY OF THE INVENTION

A method can verifiably record a voice communication between participants of the voice communication by connecting a first participant to a verifying service provider, connecting between the verifying service and at least one additional participant, recording the voice communication between the first participant and the at least one additional participant to provide a recorded voice communication and secure time-stamping the recorded voice communication to provide a verifiable recorded voice communication. In one embodiment, the voice communication between the first participant and the at least one additional participant can be established prior to connecting the first participant to the verifying service provider. In another embodiment, the verifying service provider can establish the voice communication between the first participant and the at least one additional participant after connecting between the first participant and the verifying service provider. In yet another embodiment, the method can record a voice communication of a single participant.

The method can include obtaining data for the voice communication from a switch through which the voice communication is routed and appending the data to the recorded voice communication. The switch data may be one or more of telephone numbers for the participants and date and time information for the voice communication. The participants may input identification data that can be associated with the recorded voice communication. The identification data can include one of biometrics data, passwords, digital signatures and/or auxiliary device data. The recorded voice communication can be digitally signed using the digital signatures input by the participants. The verifying service provider may authenticate the identification by matching the identification data against the stored data of service subscribers.

The verifiable recorded voice communication can be stored and the recorded voice communication can be downloaded to the participants upon respective requests by the participants. When a previously downloaded copy of the recorded voice communication may be submitted to the verifying service provider, the verifying service provider may verify that the submitted copy matches the verifiable recorded voice communication.

A system for verifiably recording a voice communication can comprise connections between participants of the voice communication and a verifying service provider, a recorder of the verifying service provider recording the voice communication between the participants and providing a recorded voice communication, a storage medium for containing the recorded voice communication and a time-stamping module to secure time-stamp the recorded voice communication to provide a verifiable recorded voice communication. A switch can facilitate connections between the participants and the verifying service provider and data from the switch can be appended to the recorded voice communication.

The system can include a public key infrastructure module to digitally sign the recorded voice communication. The participants can provide identification data, which can be associated with the recorded voice communication when the identification data matches stored data of service subscribers. The system can maintain a database of stored voice communications that can be accessed via a web server.

BRIEF DESCRIPTION OF THE DRAWINGS

The following figures depict certain illustrative embodiments in which like reference numerals refer to like elements. Reference numerals that differ by increments of 100 refer to similar parts in different embodiments. These depicted embodiments are to be understood as illustrative and not as limiting in any way.

DETAILED DESCRIPTION OF THE PREFERRED EMBODIMENTS

Figure 1:
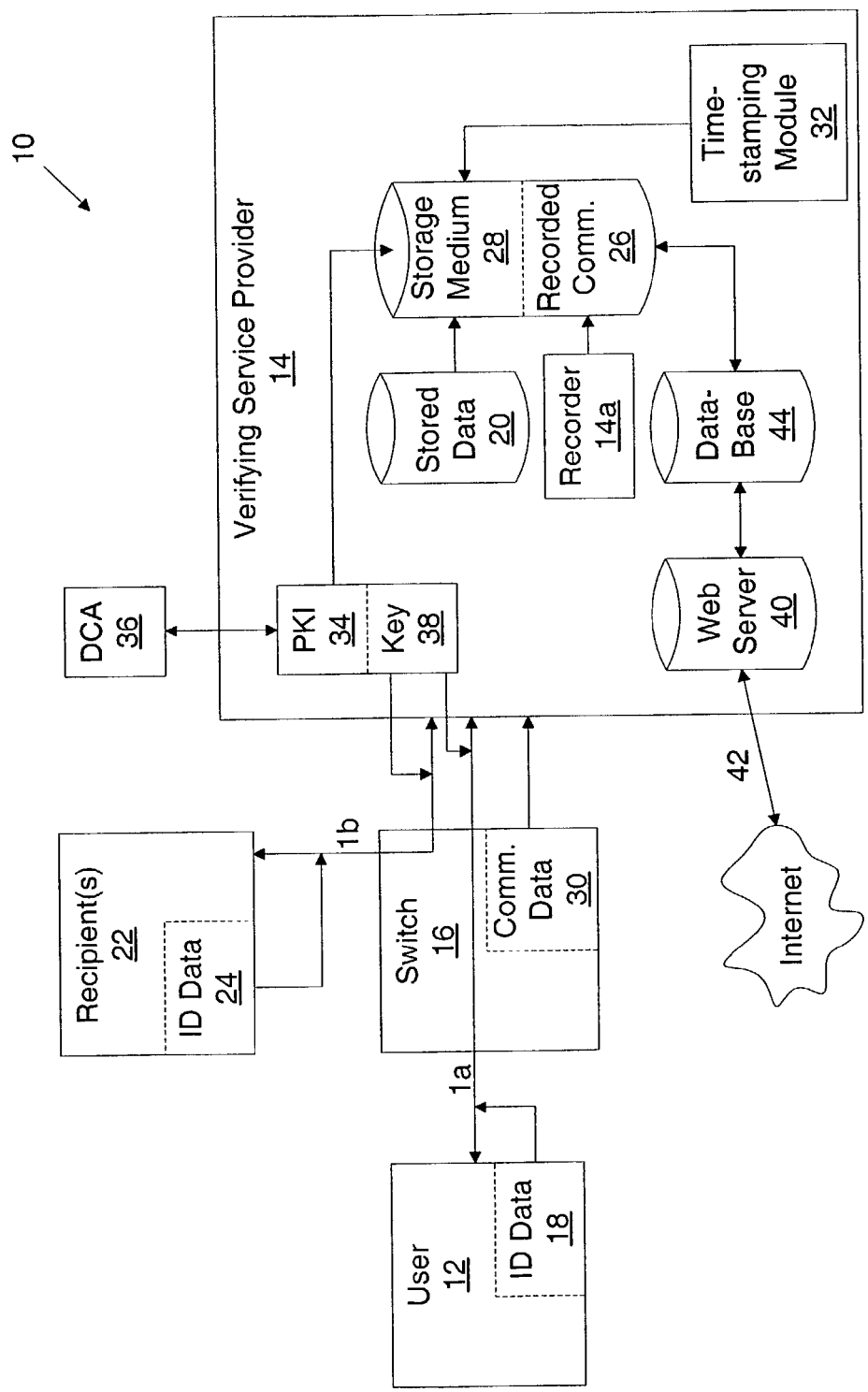
FIG. 1 shows a system for verifiably recording a voice communication.

Referring to FIG. 1, a schematic representation of a system 10 for verifiably recording a voice communication is depicted. In the embodiment of FIG. 1, a user 12 of system 10 can place a call, or otherwise connect to the verifying service provider (VSP) 14, via switch 16, as indicated by line 1a. Switch 16 may be part of a public switched telephone network (PSTN), or other voice communication network, which can route calls by dynamic shared object (DSO), realtime transport protocol (RTP) in a voice over Internet protocol (VoIP) network, or other known means. User 12 may be a subscriber of the verifying service offered by provider 14. User 12 can provide identification information, or data, 18 to provider 14, such that provider 14 can authenticate user 12 as a subscriber. Provider 14 can match the identification data to stored subscriber data 20 to authenticate user 12 as a subscriber.

The identification information 18 can include biometrics data, such as voiceprints, palmprints, retina scans, or the like, passwords or codes, digital signatures, data from an auxiliary device, such as a smartcard or credit card, or some other form of identification data, or combination thereof. When the user 12 may not be a subscriber, or when otherwise required of a subscriber, provider 14 may obtain credit and billing information from user 12, which can serve to authenticate user 12 to provider 14.

Once authentication of user 12 is complete, provider 14 can bridge the voice communication between the user 12 and the party 22 that user 12 wishes to communicate with, as indicated by line 1*b*. User 12 can dial the telephone number for party 22, or otherwise provide the necessary connection information to provider 14 for establishing the voice communication between the user 12 and the party, or call recipient 22. Provider 14 may also authenticate call recipient 22 in the manner as described for user 12 by obtaining recipient identification information, or data 24.

Recorder 14*a* of provider 14 can record the communication, or portions of the communications as desired by the user 12 and/or recipient 22, and the recorded communication 26 can be archived to storage medium 28. Provider 14 can obtain communication data 30, such as Automatic Number Identification (ANI), Dialed Number Identification Service (DNIS), date and time of call, as may be available from switch 16, and can archive the communication data 30 with the recorded communication 26. Additionally, the identification information 18, 24 can be associated with the recorded communication 26 for future access to the recorded communication 26 by the participants to the communication, i.e., by user 12 and recipient 22.

When recording is completed, a time-stamping module 32 of provider 14 can secure time-stamp the recorded communication 26. Time-stamping module 32 can utilize one, or a combination, of known secure time-stamping techniques that can provide a tamper-proof seal that establishes the creation of the recorded communication 26 at a particular date and time and that can verify that the recorded communication 26 has not been altered, edited, or otherwise changed since its creation. A public key infrastructure (PKI) module 34 of provider 14 can affix the digital signature of the user 12 and/or recipient 22 to the recorded communication 26, when a digital signature may be supplied by user 12 and/or recipient 22. PKI module 34 can utilize one, or a combination, of known PKI techniques to provide the digital signatures, including connection to a digital certificate authority (DCA) 36, and/or storage of private keys and digital certificates for subscribers of the verifying service, such as at storage data 20.

Using known PM techniques, PKI module 34 may provide user 12 and/or recipient 22 with a unique key 38 that can be used by user 12 and/or recipient 22 to retrieve the content of the recorded communication 26 and to verify that the recorded communication 26 has not been altered, edited, or otherwise changed since its creation. The user 12 and/or recipient 22 may also retrieve content and verify the recorded communication using their respective identification data 18, 24.

Access to the recorded communication 26 for retrieval and/or verification can be through a subsequent connection to the verification service provider. In addition to a voice connection through switch 16, such as 1*a* or 1*b*, provider 14 can include a web server 40 such that access can be gained via an Internet connection 42. Web server 40 can maintain a database 44 of recorded communications that can be searched, e.g., through a web-based graphic user interface (GUI), to obtain access to the desired recorded communication 26. Once access is obtained, user 12 and/or recipient 22 can request that the provider 14 download the recorded communication to the user 12 and/or recipient 22, or can request that the provider 14 display the time-stamp, communication data and identification data to the user 12 and/or recipient 22. When the user 12 and/or recipient 22 submits a previously retrieved recorded communication, time-stamping module 32 can verify that the submitted recorded communication matches the recorded communication 26 in storage medium 28, in accordance with the known secure time-stamp techniques of time-stamping module 32.

Figure 2:
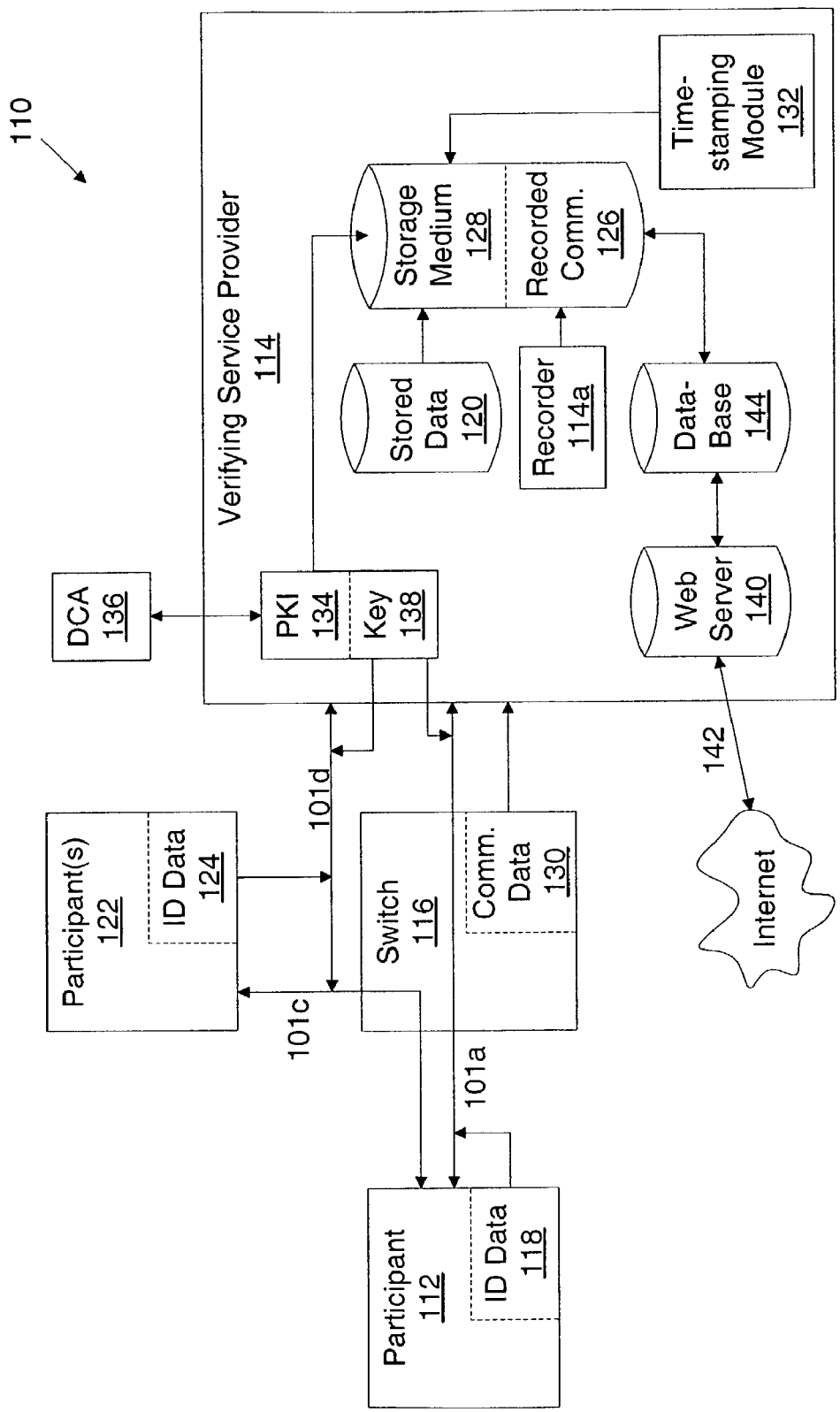
FIG. 2 shows an alternative embodiment of a system for verifiably recording a voice communication.

Referring now to FIG. 2, there is shown a schematic representation of an embodiment of a system 110 for verifiably recording a voice communication. In the embodiment of FIG. 2, a communication may be initiated between two participants 112, 122, via switch 116 and as indicated by line 101*c*. At some point in the communication, it may be determined that the remainder of the communication is to be recorded. One of the participants 112, 122 may contact provider 114, as at line 101*a*, to add provider 114 to the communication, as indicated by line 101*d*. For the exemplary embodiment of FIG. 2, participant 112 can be shown contacting provider 114, but it may be understood that participant 122 may make the contact. System 110 may utilize known techniques, such as conference calling techniques, for adding contacting provider 114 and adding provider 114 to the communication. Identification information, or data, 118 and 124 may be provided in a manner similar to that described with respect to FIG. 1.

When recording may be completed by recorder 114*a*, recorded communication 126 can be archived to storage medium 128 with communication data 130 from switch 116 and associated identification information, or data, 118, 124. Time-stamping module 132 can secure time-stamp recorded communication 126 and PKI 134 can digitally sign recorded communication 126, utilizing a connection to DCA 136, and/or storage of private keys and digital certificates for subscribers of the verifying service. PKI 134 can provide a unique key 138 to participants 112, 122 utilizing PKI 134. System 110 can include web server 140 and communication database 144 that may operate in the manner of web server 40 and database 44 of FIG. 1 to provide access to the recorded communication 126 via Internet connection 142.

Figure 3:
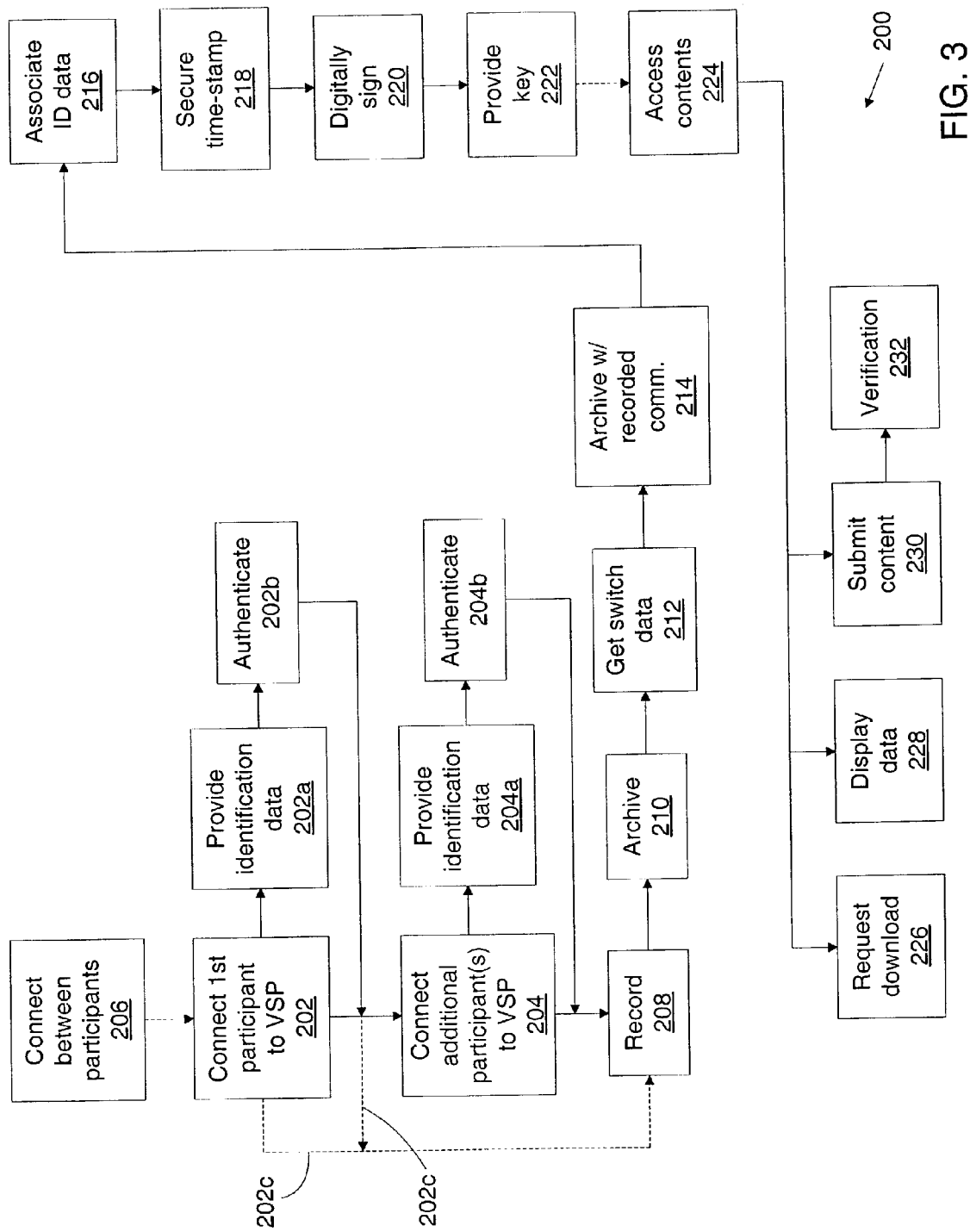
FIG. 3 shows a method for verifiably recording a voice communication.

FIG. 3 shows a flow chart illustrating a method 200 for verifiably recording a voice communication. A call participant can connect (202) to a verifying service provider, such as provider 14, 114. A connection can then be made (204) between the provider and additional participants. For the embodiment of FIG. 1, provider 14 may serve as a bridge between the participants, such that making the connection at 204 establishes the connection between the participants. For the embodiment of FIG. 2, a connection between the participants may have been made (206) prior to the connection to the provider at 202. In making the connections at 202, 204, the participants can provide (202*a*, 204*a*) identification information for authentication (202*b*, 204*b*) by the provider. Once connections have been established, the provider can record the communication (208).

The recorded communication can be archived (210) to storage medium 28, 128. Communication data 30, 130, as from switch 16, 116, can be obtained (212) and archived with, or appended to (214) the recorded communication. Identification information, or data, 18, 24, 118, 124, can be associated with (216) the recorded communication. The recorded communication may then be secure time-stamped (218). When available from the participants, the recorded communication can be digitally signed (220) using the participants' digital signatures, as described with relation to FIGS. 1 and 2 and a unique key can be provided (222) to the participants for access (224) to the contents of the recorded communication.

Access may also be obtained using the identification information as provided when making connections between the participants and the provider.

When access is obtained, a request can be made (224) to have the provider download (226) the content of the recorded communication, or to display (228) the secure time-stamp, communication data and associated identification information data for the recorded communication. Previously retrieved content may be submitted (230) for verification (232) by the provider.

The systems and methods described herein may not be limited to a particular hardware or software configuration; they may find applicability in many communication environments. The techniques may be implemented in hardware or software, or a combination thereof. The systems and methods can be implemented in one or more computer programs executing on one or more programmable computers, such as may be exemplified by time-stamping module 32, 132, PKI 34, 134, and/or web server 40, 140, that include a processor, a storage medium readable by the processor (including volatile and non-volatile memory and/or storage elements), one or more input devices, and one or more output devices. Additionally, verifying service provider 14 may be one or more processors configured to include the components described herein and to implement the systems and methods described herein.

In one embodiment, the systems and methods may be implemented on a computer in a network, as may be exemplified by web server 40, 140, or the computer may be a switch or a server in a phone network, such as may be exemplified by switch 16, 116. Participant connections and/or access may be provided through a telephone user interface that may be incorporated with an Internet Service Provider user interface, as exemplified by Internet connection 42, 142.

The computer programs, or programs, may be preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, the embodiments of FIGS. 1-2 may include connections to additional participants who may take part in the communication to be recorded. As with the two participants described in relation to FIGS. 1 and 2, additional participants may provide identification data for authentication by the VSP 14, 114.

In one embodiment, a single participant 12, 112 can make use of the system without connecting to an additional participant 22, 122. In this embodiment, the user 12, or participant 112 may wish to provide an oral description, or other oral information, that may require recording and time-stamping for future verification. With reference to FIG. 1, user 12 may provide a code, such as, but not limited to, the # sign, or * sign, in lieu of providing the recipient connection information, to indicate to provider 14 that no additional connection is to be made. With reference to FIG. 2, the participant 112 merely may not make the connection 101c to other participants prior to contacting provider 114. With reference to FIG. 3, the connection to the additional participants at 204 may be bypassed, as indicated by phantom lines 202c.

Additionally, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A processor-implemented method of recording a verifiable voice communication, comprising:

connecting to a communication already in progress between a first participant and at least one additional participant by a verifying service provider;

receiving authentication information from the first participant, wherein the received authentication information is of a type that is based on a subscription status of the first participant and includes first participant personal identification data chosen from a listing of identification data including at least one of biometrics data, passwords and auxiliary device data;

authenticating the first participant based on the received authentication information;

recording the voice communication between the first participant and the at least one additional participant to provide a recorded voice communication when the first participant is successfully authenticated;

associating the identification data with the recorded voice communication;

retrieving call number information associated with the communication from a switch through which the communication is routed;

associating the call number information with the recorded voice communication;

secure time-stamping by the processor the recorded voice communication at the verifying service provider to provide a verifiable recorded voice communication, wherein the secure time-stamping is tamper-proof;

affixing by a public key infrastructure a digital signature to the recorded voice communication based on a unique key, the digital signature being provided by the first participant;

archiving the secure time-stamped recorded voice communication;

receiving a request for a copy of the verifiable archived recorded voice communication at the verifying service provider;

providing the requested copy of the verifiable archived recorded voice communication;

receiving a submission of the provided copy of the verifiable archived recorded voice communication, superficially as provided, at the verifying service provider; and verifying by the processor at the verifying service provider that the submission of the provided copy matches the verifiable archived recorded voice communication based on the time-stamping and the unique key.

2. The method of claim 1, wherein connecting the first participant to the verifying service provider comprises the first participant contacting the verifying service provider.

3. The method of claim 1, wherein the first participant contacting the verifying service provider comprises the first participant conference calling the verifying service provider.

4. The method of claim 1, wherein recording comprises:
obtaining data for the voice communication from the switch through which the voice communication is routed; and
appending the data to the recorded voice communication.

5. The method of claim 4, wherein obtaining data comprises obtaining one or more of telephone numbers for the first participant and the at least one additional participant and date and time information for the voice communication.

6. The method of claim 4, wherein recording comprises digitally signing the recorded voice communication using the digital signatures input by the first participant and the at least one additional participant.

7. The method of claim 6, comprising:
storing the verifiable recorded voice communication; and
downloading the recorded voice communication to at least one of the first participant and the at least one additional participant upon a respective request by the first participant and the at least one additional participant.

8. The method of claim 7, wherein downloading and receiving a copy of the recorded voice communication at the verifying service provider comprises transmitting data via an internet web server.

9. The method of claim 1, wherein receiving the auxiliary device data comprises receiving data transmitted from a smartcard.

10. The method of claim 1, wherein connecting between the verifying service and at least one additional participant comprises authenticating the at least one additional participant to the verifying service provider.

11. The method of claim 10, wherein recording comprises digitally signing the recorded voice communication with a digital signature of the at least one additional participant.

12. The method of claim 10, wherein receiving the auxiliary device data comprises receiving data transmitted from a smartcard.

13. The method of claim 1, comprising:
storing the verifiable recorded voice communication; and
downloading the recorded voice communication to at least one of the first participant and the at least one additional participant upon a respective request by the first participant and the at least one additional participant.

14. The method of claim 13, comprising authenticating the respective request as a request from one of the first participant and the at least one additional participant prior to downloading the recorded voice communication.

15. The method of claim 1, wherein receiving a copy of the recorded voice communication at the verifying service provider comprises receiving data via an internet web server.

16. A computer-implemented system for recording a verifiable voice communication, comprising:
a processor;
connections between participants of the voice communication;
a communications connector for contacting and adding connections between participants of the voice communication and a verifying service provider once the connections between participants are established;
an authenticator of received authentication information to authenticate at least one of the participants based on the received authentication information, wherein the received authentication information is of a type that is based on a subscription status of at least one of the participants and includes first participant personal identification data chosen from a listing of identification data including at least one of biometrics data, passwords and auxiliary device data;
a recorder of the verifying service provider recording the voice communication between the participants and providing a recorded voice communication when the received authentication information is successfully authenticated;
a storage device for containing the recorded voice communication in association with the identification data and with call number information associated with the voice communication and retrieved from a switch through which the voice communication is routed;
a time-stamping module to secure time-stamp by the processor the recorded voice communication to provide a verifiable recorded voice communication, wherein the secure-time stamping is tamper-proof;
a public key infrastructure module to digitally sign the recorded voice communication based on a unique key and on a digital signature provided by one of the participants of the voice communication;
an archiving module to archive the secure time-stamped recorded voice communication; and
a web server for receiving a request for a copy of the verifiable archived recorded voice communication, providing the requested copy of the verifiable archived recorded voice communication and receiving a submission of the provided copy of the verifiable archived recorded voice communication, superficially as provided, the time-stamping module verifying by the processor at the verifying service provider that the submission of the provided copy matches the verifiable archived recorded voice communication based on the time-stamping and the unique key.

17. The system of claim 16, comprising:
a database of stored voice communications; and
a connection between the database of stored communications and the web server to provide Internet access to the database.

18. A processor-implemented method of recording a verifiable voice communication, comprising:
connecting a sole participant to a verifying service provider via a voice communication network switch;
receiving authentication information from the sole participant, wherein the received authentication information is of a type that is based on a subscription status of the sole participant and includes sole participant personal identification data chosen from a listing of identification data including at least one of biometrics data, passwords and auxiliary device data;
authenticating the sole participant based on the received authentication information;
recording the voice communication of the sole participant to provide a recorded voice communication when the sole participant is successfully authenticated;
associating the identification data with the recorded voice communication;
obtaining call number data for the voice communication from the voice communication network switch through which the voice communication is routed;

appending the call number data to the recorded voice communication;

secure time-stamping by the processor the recorded voice communication to provide a verifiable recorded voice communication, wherein the secure time-stamping is tamper-proof;

affixing by a public key infrastructure a digital signature to the recorded voice communication based on a unique key, the digital signature being provided by the sole participant;

archiving the secure time-stamped recorded voice communication;

receiving a request for a copy of the verifiable archived recorded voice communication at the verifying service provider;

providing the copy of the verifiable archived recorded voice communication;

receiving a submission of the provided copy of the verifiable archived recorded voice communication, superficially as provided, at the verifying service provider; and verifying by the processor at the verifying service provider that the submission of the provided copy matches the archived verifiable recorded voice communication based on the time-stamping and the unique key.

19. The method of claim 18, wherein obtaining data comprises obtaining a date and time information for the voice communication.

20. The method of claim 18, comprising:
storing the verifiable recorded voice communication; and
downloading the recorded voice communication to the participant upon a request by the participant.

21. The method of claim 20, wherein downloading and receiving a copy of the recorded voice communication at the verifying service provider comprises transmitting data via an internet web server.

22. The method of claim 1, wherein the personal identification data is a voiceprint.

23. The method of claim 1, wherein receiving authentication information from the first participant further comprises:
receiving credit and billing information from the first participant when the first participant is a non-subscriber.

* * * * *